US007024895B2

(12) United States Patent
Watanuki et al.

(10) Patent No.: US 7,024,895 B2
(45) Date of Patent: Apr. 11, 2006

(54) ELECTRICAL STEERING LOCK DEVICE AND RELATED METHOD

(75) Inventors: Yoshio Watanuki, Kanagawa-ken (JP); Ryuichi Yoshida, Kanagawa-ken (JP); Katsuji Konii, Kanawaga-ken (JP)

(73) Assignees: Alpha Corporation, Kanagawa-Ken (JP); Nissan Motor Co., LTD, Kanagawa-Ken (JP)

(*) Notice: Subject to any disclaimer, the term of this patent is extended or adjusted under 35 U.S.C. 154(b) by 0 days.

(21) Appl. No.: 10/864,598

(22) Filed: Jun. 10, 2004

(65) Prior Publication Data

US 2004/0250577 A1 Dec. 16, 2004

(30) Foreign Application Priority Data

Jun. 13, 2003 (JP) ........................ P 2003-169794

(51) Int. Cl.
*B60R 25/02* (2006.01)

(52) U.S. Cl. ........................................................ 70/186

(58) Field of Classification Search .......... 70/182–186, 70/252

See application file for complete search history.

(56) References Cited

U.S. PATENT DOCUMENTS

| | | | | |
|---|---|---|---|---|
| 3,553,987 | A | 1/1971 | Ball et al. | |
| 6,571,587 | B1 * | 6/2003 | Dimig et al. | 70/186 |
| 2002/0069683 | A1 | 6/2002 | Bartels et al. | |
| 2002/0088257 | A1 | 7/2002 | Dimig et al. | |
| 2003/0067216 | A1 | 4/2003 | Nagae et al. | |

FOREIGN PATENT DOCUMENTS

| | | |
|---|---|---|
| JP | 2002-205622 | 7/2002 |

* cited by examiner

*Primary Examiner*—Lloyd A. Gall
(74) *Attorney, Agent, or Firm*—Nath & Associates PLLC; Gregory B. Kang; Teresa M. Arroyo

(57) ABSTRACT

An electrical steering lock device and a related method are disclosed wherein a plate cam 17 has a contoured profile determined such that a lock shaft 15 moves inside a lock groove 13 at a travel speed (first speed) lower than a travel speed (second speed) at which the lock shaft 15 moves outside the lock groove 13, enabling the lock shaft 15 to disengage from the lock groove 13 with increased torque. This results in a capability of reliably disengaging the lock shaft 15 from the lock groove 13.

6 Claims, 13 Drawing Sheets

ELECTRICAL STEERING LOCK DEVICE AND RELATED METHOD

BACKGROUND OF THE INVENTION

The present invention relates to an electrical steering lock device for anti-theft of a vehicle and a related method.

An electrical steering lock device, disclosed in Japanese Patent Provisional Publication No. 2002-205622, is arranged to render a lock shaft, adapted to protrude and retract in linkage with an electric motor, engageable with and disengageable from a steering shaft to lock and unlock rotation of the steering shaft.

FIGS. 1 and 2 show how a steering shaft 101 is unlocked from a locked condition to an unlocked condition in an electrical steering lock device 100 of the type mentioned above. Under such a locked condition of the steering shaft 101 as shown in FIG. 1, a wall surface of a lock groove 103 is held in strongly pressured contact with the lock shaft 102 due to a restoring force X applied to the steering shaft 101 resulting from frictional resistance between tires and road surface. For this reason, during a process in which the steering shaft 101 is unlocked, the lock shaft 102 is applied with increased load when the lock shaft 102 is moved from the lock groove 103 (in a way as shown in FIG. 1→FIG. 2), whereas no load is applied to the lock shaft 102 after the lock shaft 102 has disengaged from the lock groove 103 (in a way as shown in FIG. 2→FIG. 3).

As a result, the lock shaft 102, which protrudes and retracts upon receipt of a fixed drive force from the electric motor, undergoes an issue with an inability of disengaging from the lock groove 103 depending upon a magnitude of load being applied.

SUMMARY OF THE INVENTION

The present invention has been completed with the above issue in mind and has an object to provide an electrical steering lock device, that is able to reliably disengage a lock shaft from a lock groove, and a related method.

In one aspect of the present invention, an electrical steering lock device comprises a lock shaft operative to protrude into and retract from a lock groove, formed on a steering shaft, such that the lock shaft assumes a protruding position to engage with the lock groove for locking rotation of the steering shaft while assuming a retracting position to disengage from the lock groove for unlocking rotation of the steering shaft, and a drive unit for protruding and retracting the lock shaft, wherein a retracting force, with which the lock shaft is retracted from the lock groove by the drive unit, is set such that the retracting force, occurring when the lock shaft is moved inside the lock groove, is set to be greater than that occurring when the lock shaft is moved outside the lock groove.

In another aspect of the present invention, there is provided a method of locking a steering shaft, comprising preparing a lock groove formed on a steering shaft, preparing a steering shaft formed with a lock groove, preparing a lock shaft operative to protrude into and retract from the lock groove such that the lock shaft assumes a protruding position to engage with the lock groove for blocking rotation of the steering shaft while assuming a retracting position to disengage from the lock groove for unlocking rotation of the steering shaft, and driving the lock shaft in protruding and retracting directions with a retracting force, occurring when the lock shaft is retracted from the lock groove by the drive unit, which varies such that the retracting force, occurring when the lock shaft is moved inside the lock groove, is greater than that occurring when the lock shaft is moved outside the lock groove.

DETAILED DESCRIPTION OF THE PREFERRED EMBODIMENT

Now, embodiments of the present invention are described below with reference to the accompanying drawings.

First Embodiment

Figure 1:
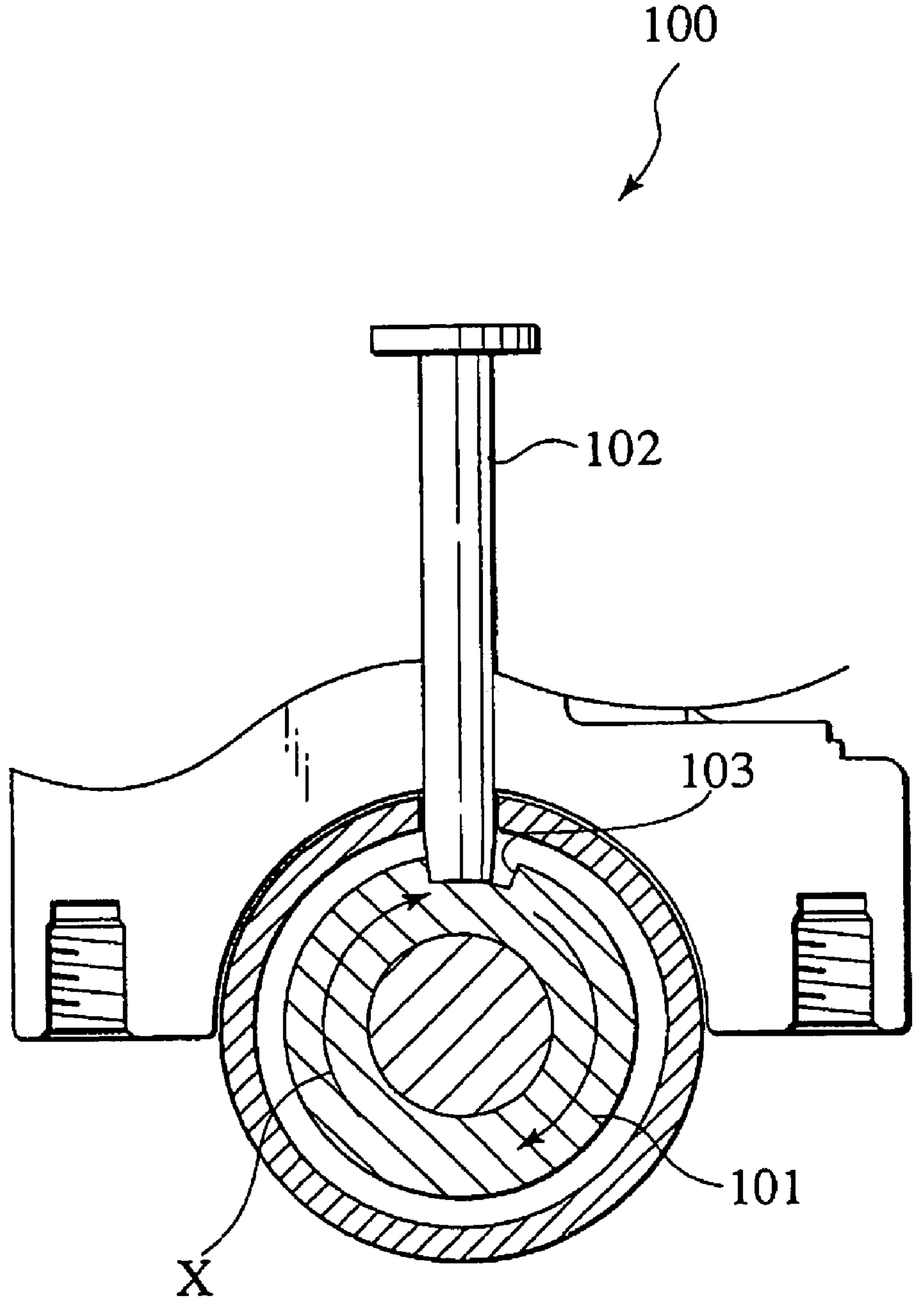
FIG. 1 is a view illustrating a locked condition of a steering shaft in an electrical steering lock device of a state-of-the art.
Figure 2:
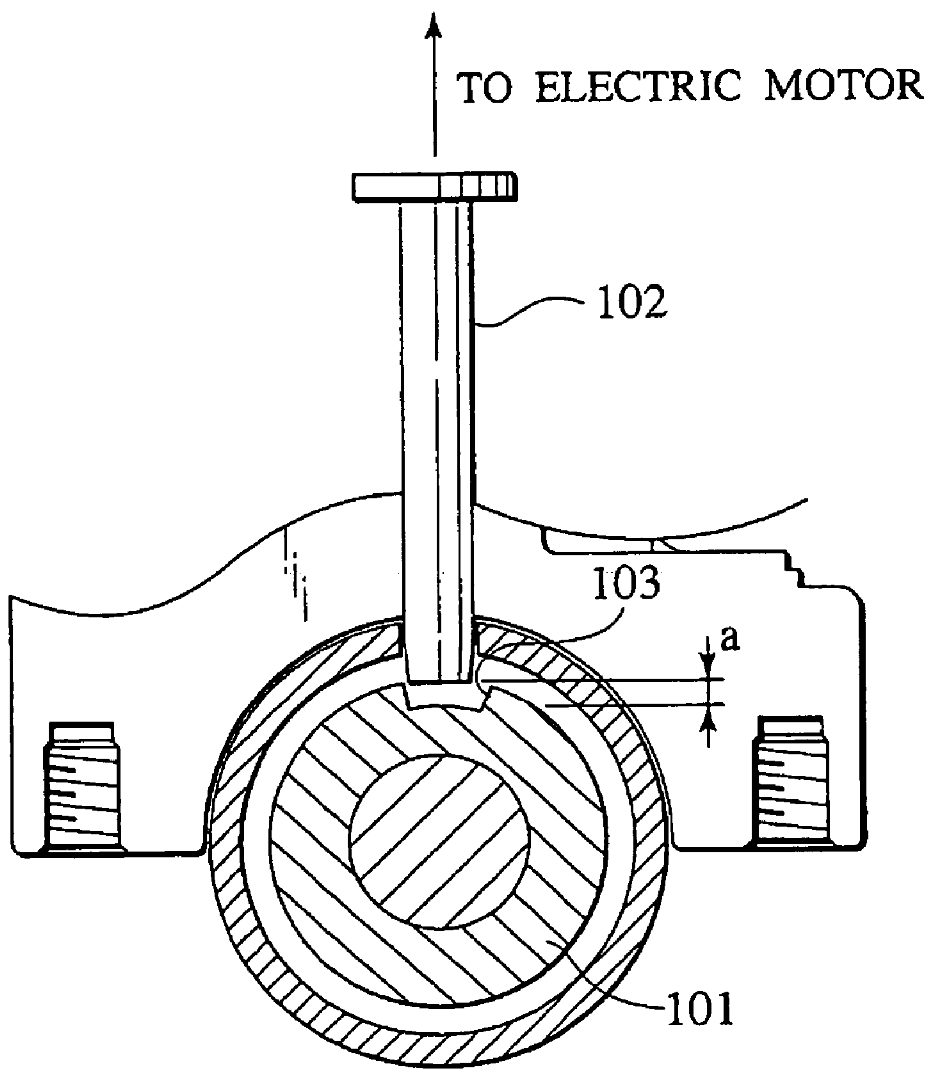
FIG. 2 is a view illustrating a status in a mid-course wherein the steering shaft is progressively unlocked in the electrical steering lock device shown in FIG. 1.
Figure 3:
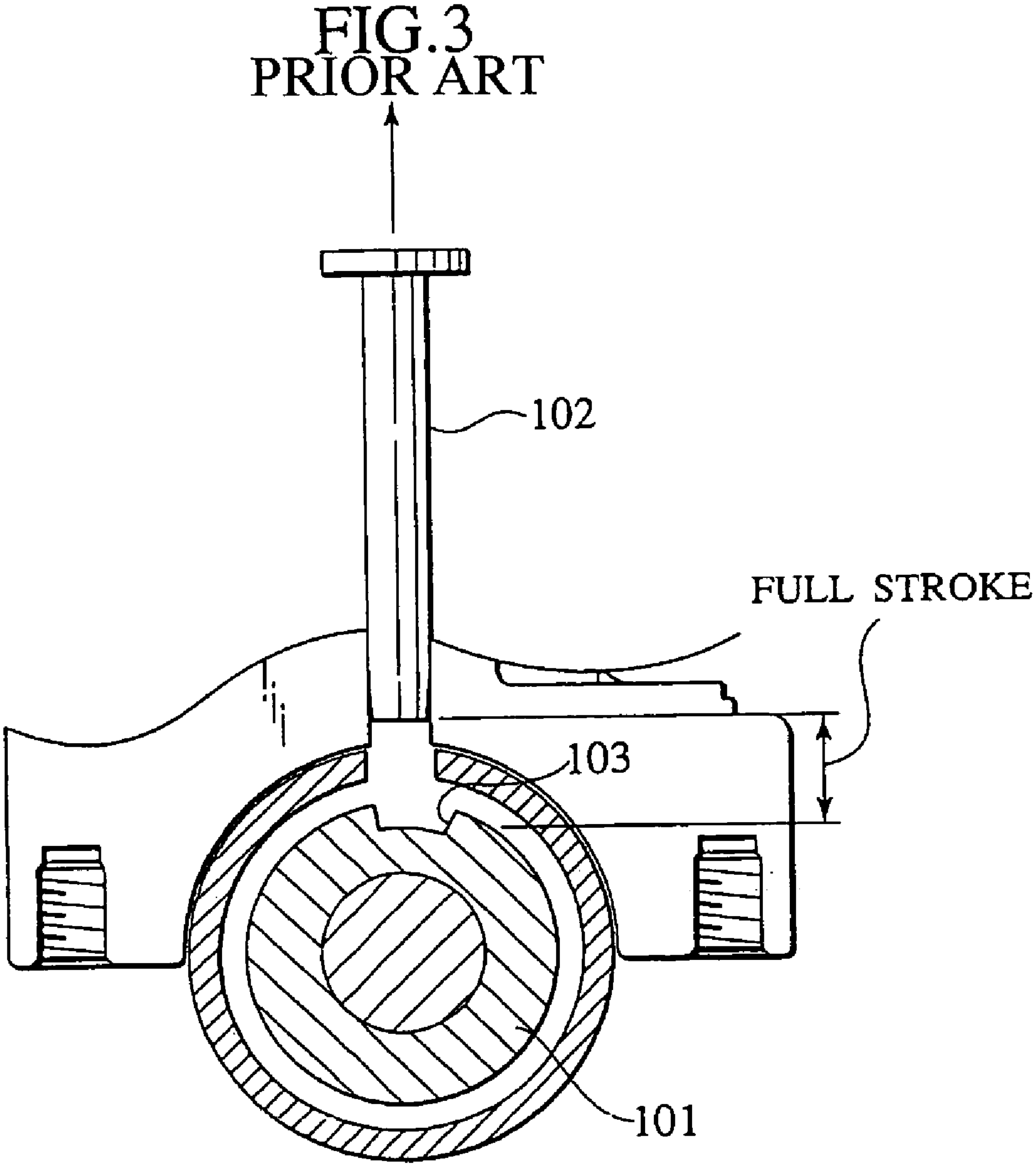
FIG. 3 is a view illustrating an unlocked condition of the steering shaft in the electrical steering lock device shown in FIG. 1.
Figure 4:
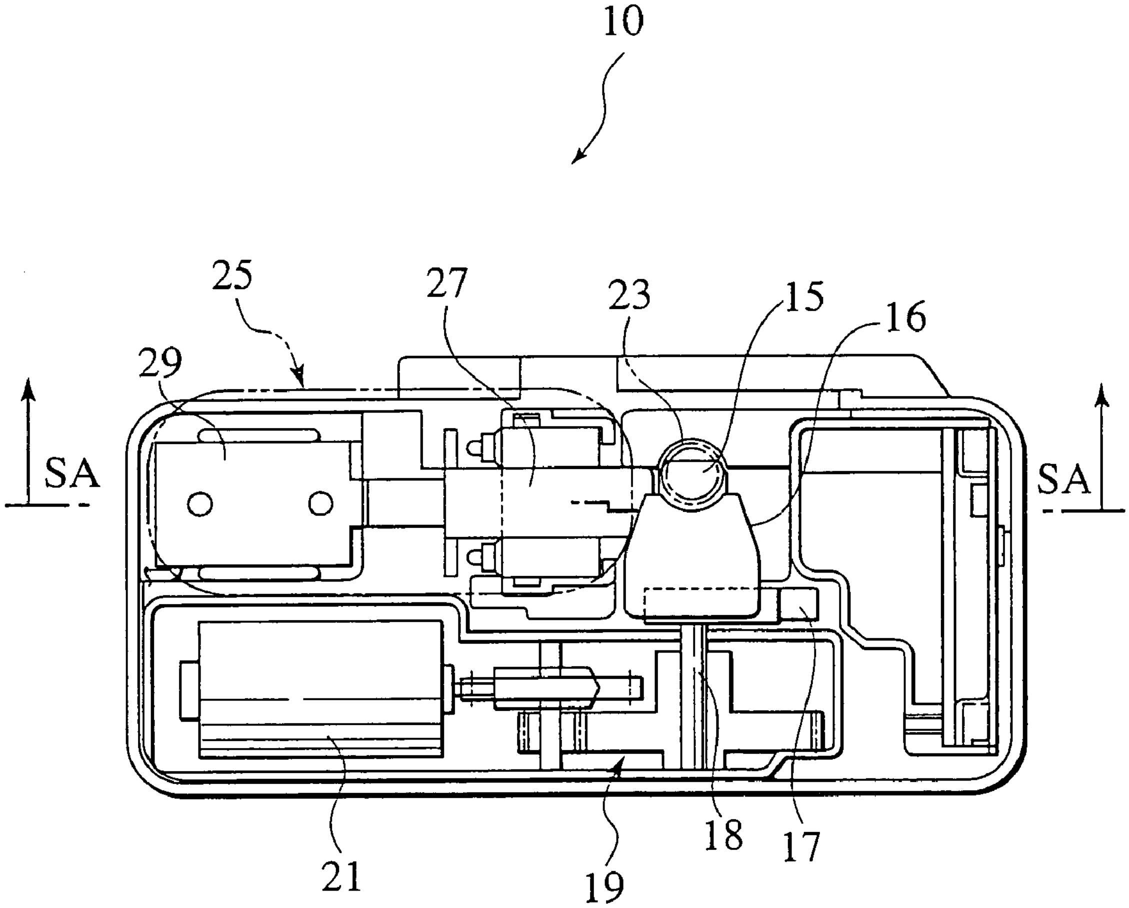
FIG. 4 is a front view illustrating an electrical steering lock device of a first embodiment of the present invention.
Figure 5:
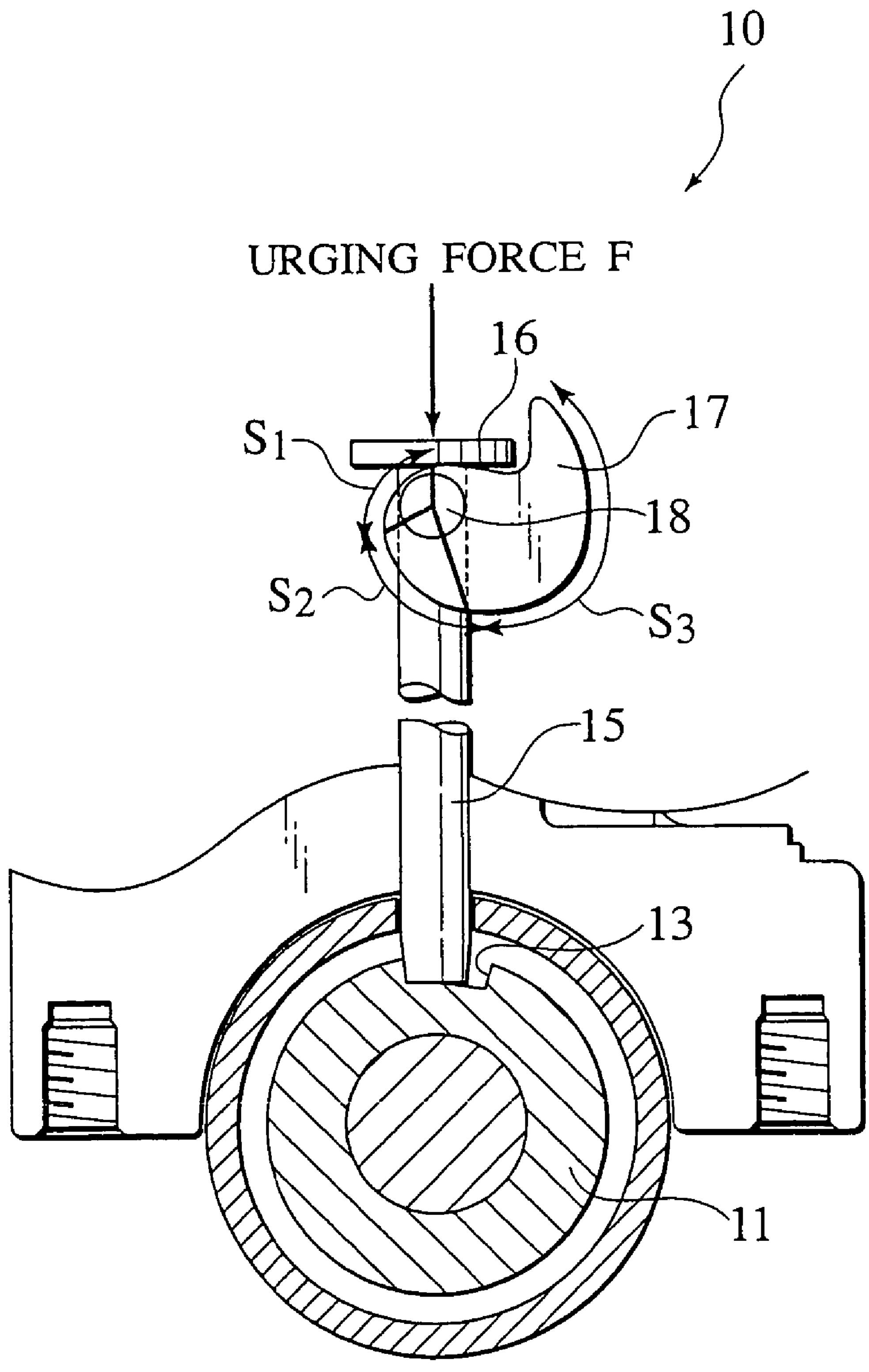
FIG. 5 is a schematic cross sectional view showing an essential part of the electrical steering lock device shown in FIG. 4, with a steering shaft being shown in a locked condition.
Figure 6:
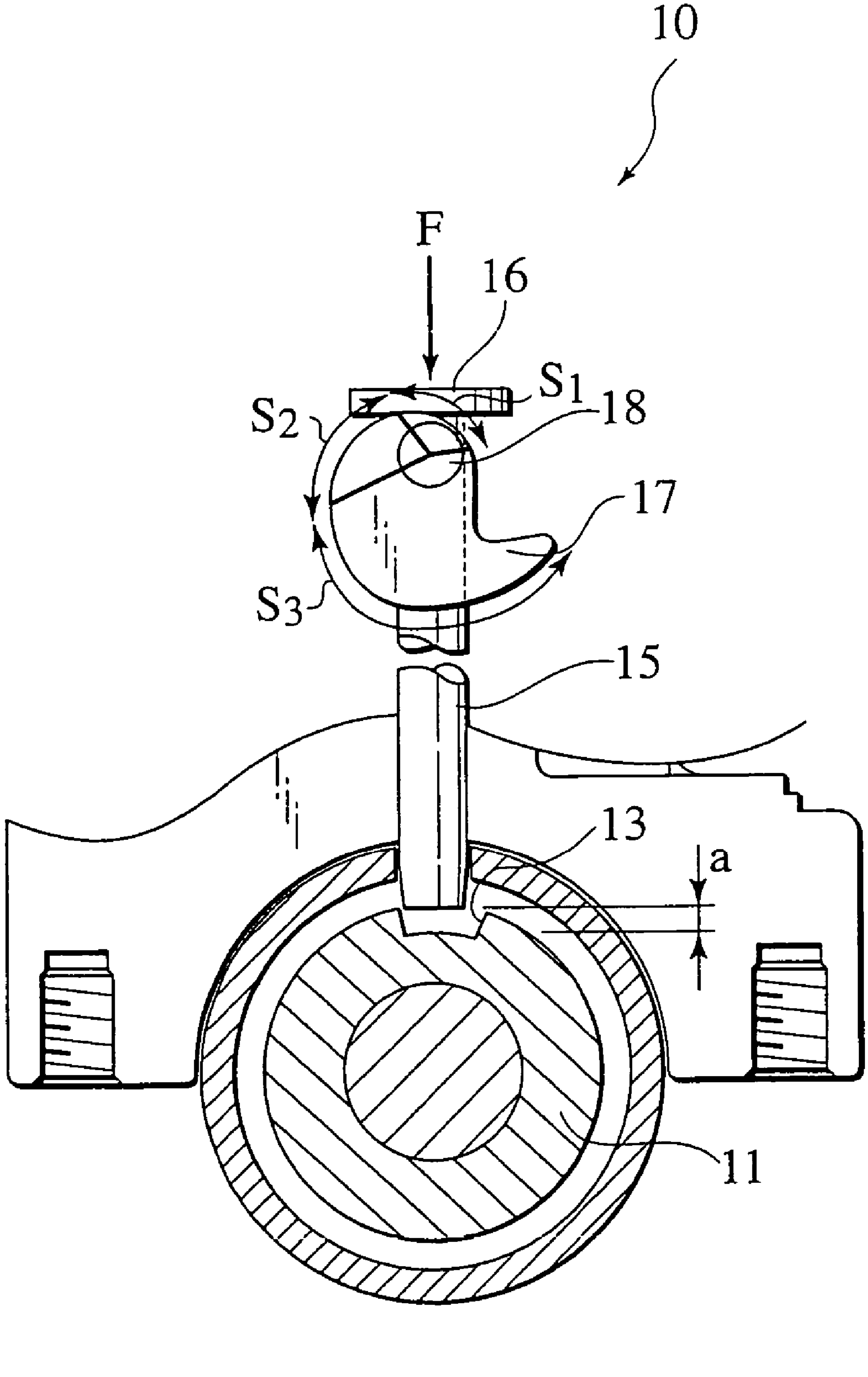
FIG. 6 is a schematic cross sectional view showing the essential part of the electrical steering lock device shown in FIG. 4, with the steering shaft being shown in a midway to be moved in an unlocked condition.
Figure 7:
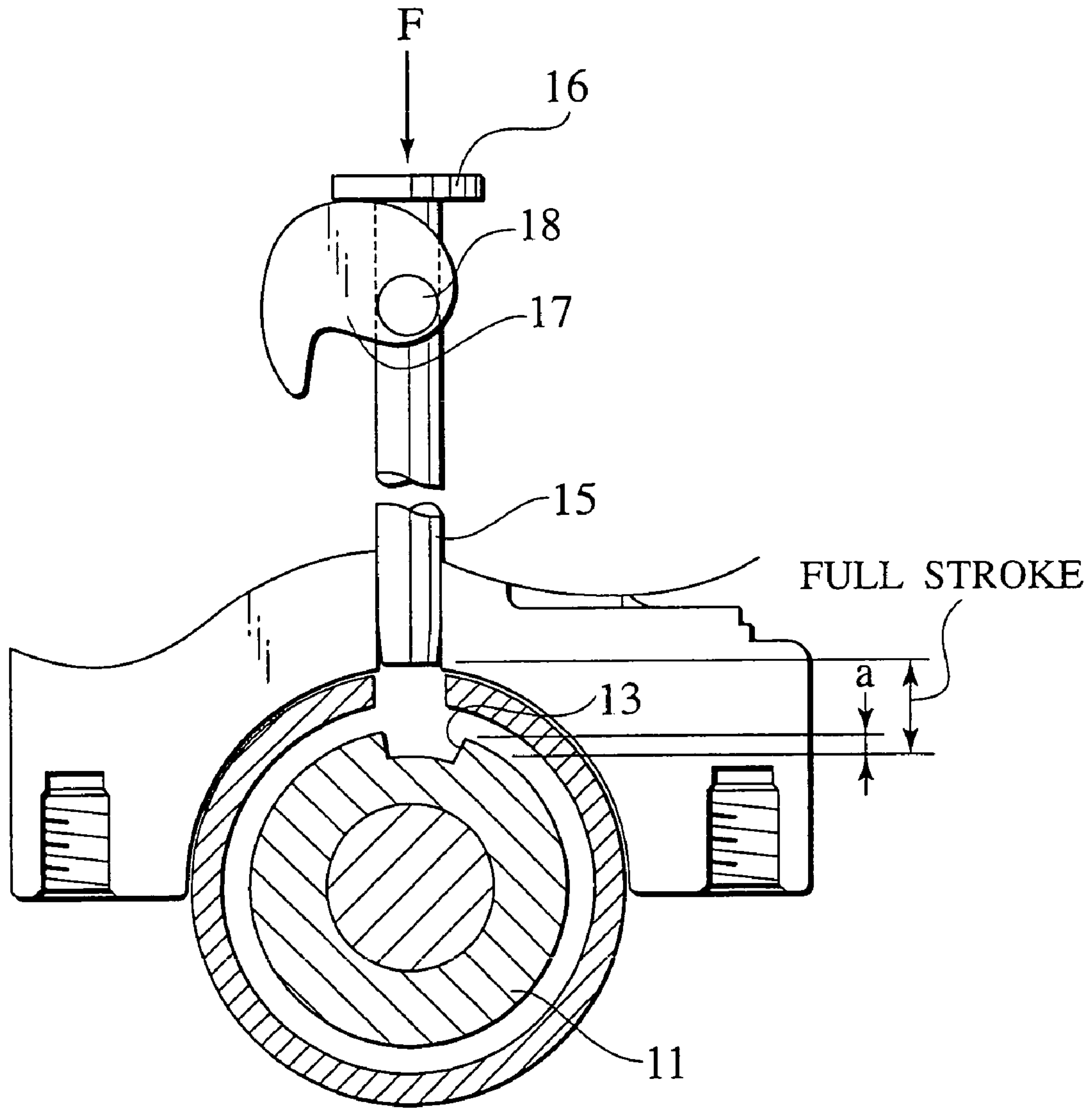
FIG. 7 is a schematic cross sectional view showing the essential part of the electrical steering lock device shown in FIG. 4, with the steering shaft being shown in the unlocked condition.

An electrical steering lock device of a first embodiment of the present invention is described below in connection with FIGS. 4 to 11. FIGS. 5 to 7 are schematic cross sectional views illustrating essential parts of the electrical steering lock device of the first embodiment.

As shown in FIGS. 5 to 7, the steering lock device 10 has a fundamental structure that is comprised of a lock shaft 15, serving as a "cam follower", which is operative to protrude into or retract from a lock groove 13 formed on a steering shaft 11, a plate cam 17 serving as a “drive member” for operating the lock shaft 15 for protruding and retracting movements, and a drive motor (designated at reference numeral 21 in FIG. 4), serving as a drive device which is not shown, that is connected to the plate cam 17 through a gear reduction mechanism (designated at reference numeral 19 in FIG. 4), which is not shown.

The lock shaft 15 is operative to assume a protruding position, as shown in FIG. 5, in which the lock shaft 15 is placed inside the lock groove 13 for blocking rotation of the steering shaft 11 and a retracting position, as shown in FIG. 7, in which the lock shaft 15 is dislocated outside the lock groove 13 for thereby unlocking rotation of the steering shaft 11.

Formed on the lock shaft 15, serving as the cam follower, is a head portion that is formed with a plate-like contact element 16. Held in abutting engagement with the contact element 16 of the lock shaft 15 at a retracting side (shown at an upper area of FIGS. 5 to 7) is a compression spring (designated by reference numeral 23 in FIG. 4), and held in abutting engagement with the contact element 16 at a protruding side (shown at a lower area in FIGS. 5 to 7) is the plate cam 17 that serves as the drive member. This allows the lock shaft 15 to be applied with urging force F at all times from the retracting side toward the protruding side, while the lock shaft 15 is made operative to move in protruding or retracting directions accompanied by rotation of the plate cam 17 that is placed opposite to the compression spring.

The subject matter of the first embodiment is characterized by the plate cam 17 with a contoured profile that is determined such that the lock shaft 15 protrudes and retracts at differing speeds; that is, a first speed V1, occurring when the lock shaft 15 moves from inside the lock groove 13, and a second speed V2 at which the lock shaft 15 moves in an area outside the lock groove 13, with the first speed being set to be slower than the second speed. That is, a vorticosely-contoured profile of the plate-like cam 17 formed about a center of a rotary shaft 18 is so determined as to allow an area S1 [with a rotational angle in a range from 0° (at a stroke of 0) to 90° (at a stroke of a)], corresponding to the first speed V1, to be set in a decreased divergence angle while an area S2 [with a rotational angle in a range from 90° (at the stroke of a) to 180° (at a full stroke)] corresponding to the second speed V2 has an increased divergence angle. Also, the present invention has no object on a contoured profile in an area S3 beyond the full stroke.

With the electrical steering lock device 10 of the first embodiment with such a structure, since a traveling speed (first speed V1) at which the lock shaft 15 travels in the lock groove 13 is set to be slow, the lock shaft 15 can be escaped from the lock groove 13 toward the outside thereof with increased torque. This results in a capability of the lock shaft 15 being disengaged from the lock groove 13 without causing the electric motor 21 to be largely sized. When this takes place, the second speed V2 is determined to be higher than the first speed V1, resulting in no probability of the occurrence in delay in an unlocking time.

Figure 8:
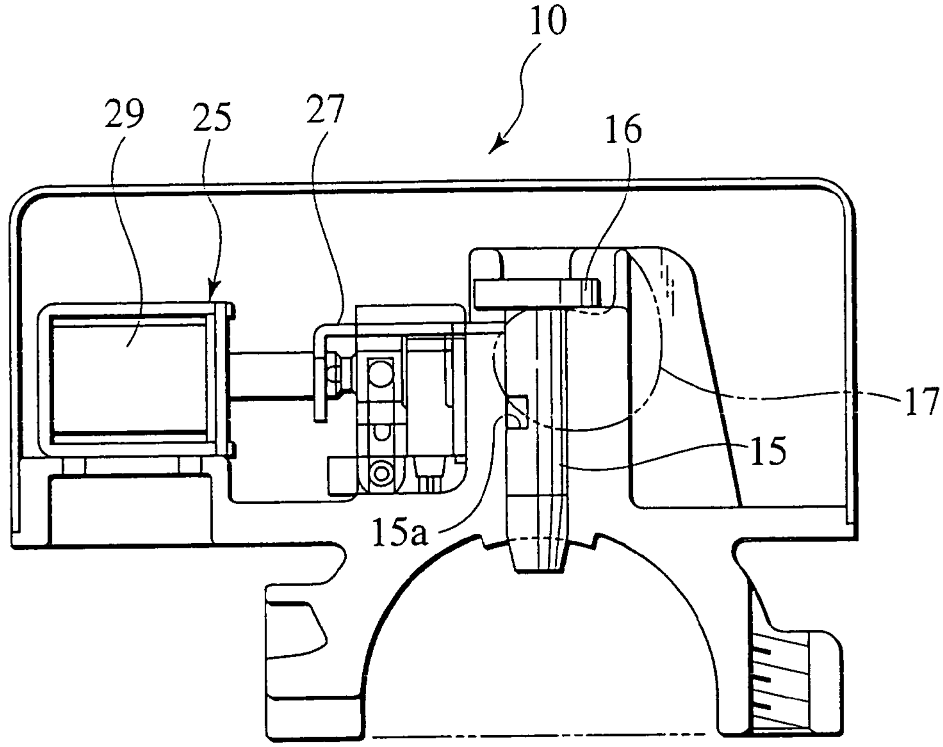
FIG. 8 is a cross sectional view taken on line SA—SA in FIG. 4 and showing the steering shaft remaining in the locked condition like in FIG. 2.

Also, the electrical steering lock device 10 of the first embodiment includes a steering-lock prevention device 25. Hereunder, the steering-lock prevention device is described with reference to FIG. 4 and FIGS. 8 to 10. FIG. 4 is a front view illustrating the electric steering lock device of the first embodiment, and FIGS. 8 to 10 are cross sectional views taken on line SA—SA.

The steering-lock prevention device 25 serves to prevent the steering shaft 11 from a danger of unintentional lock during traveling of a vehicle and operates to preclude the lock shaft 15, urged by the spring 23, from moving in a protruding direction to lock the steering shaft 11 in an event that the drive motor 21 erroneously operates to suddenly rotate the plate cam 17 or in an event that the lock shaft 15 is suddenly dropped out from the plate cam 17 due to strenuous vibrations.

Figure 9:
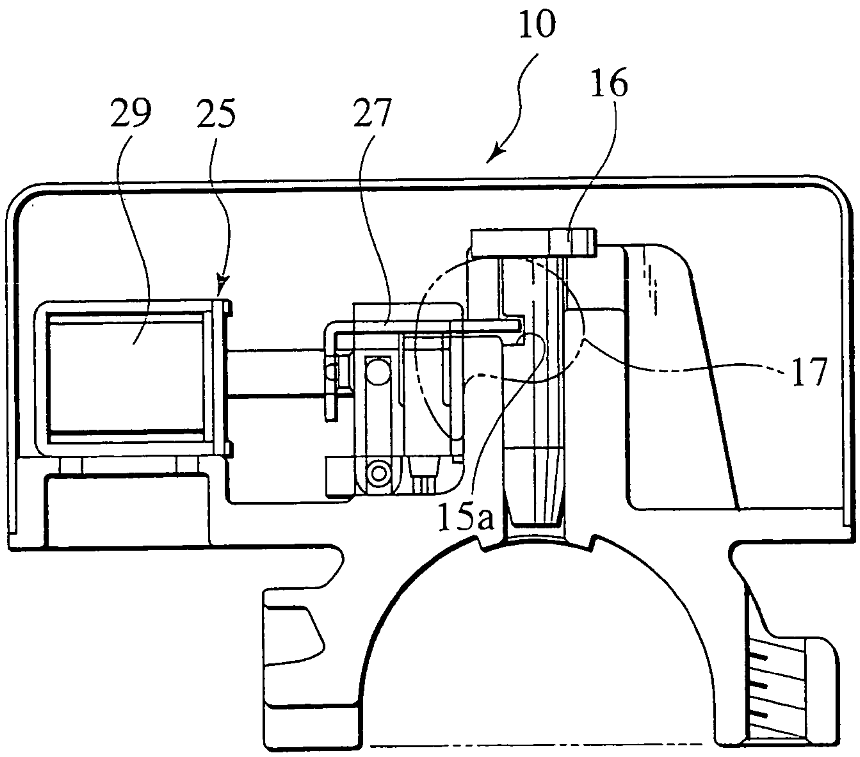
FIG. 9 is a cross sectional view taken on line SA—SA in FIG. 4 and showing the steering shaft remaining in the locked condition of like in FIG. 4.
Figure 10:
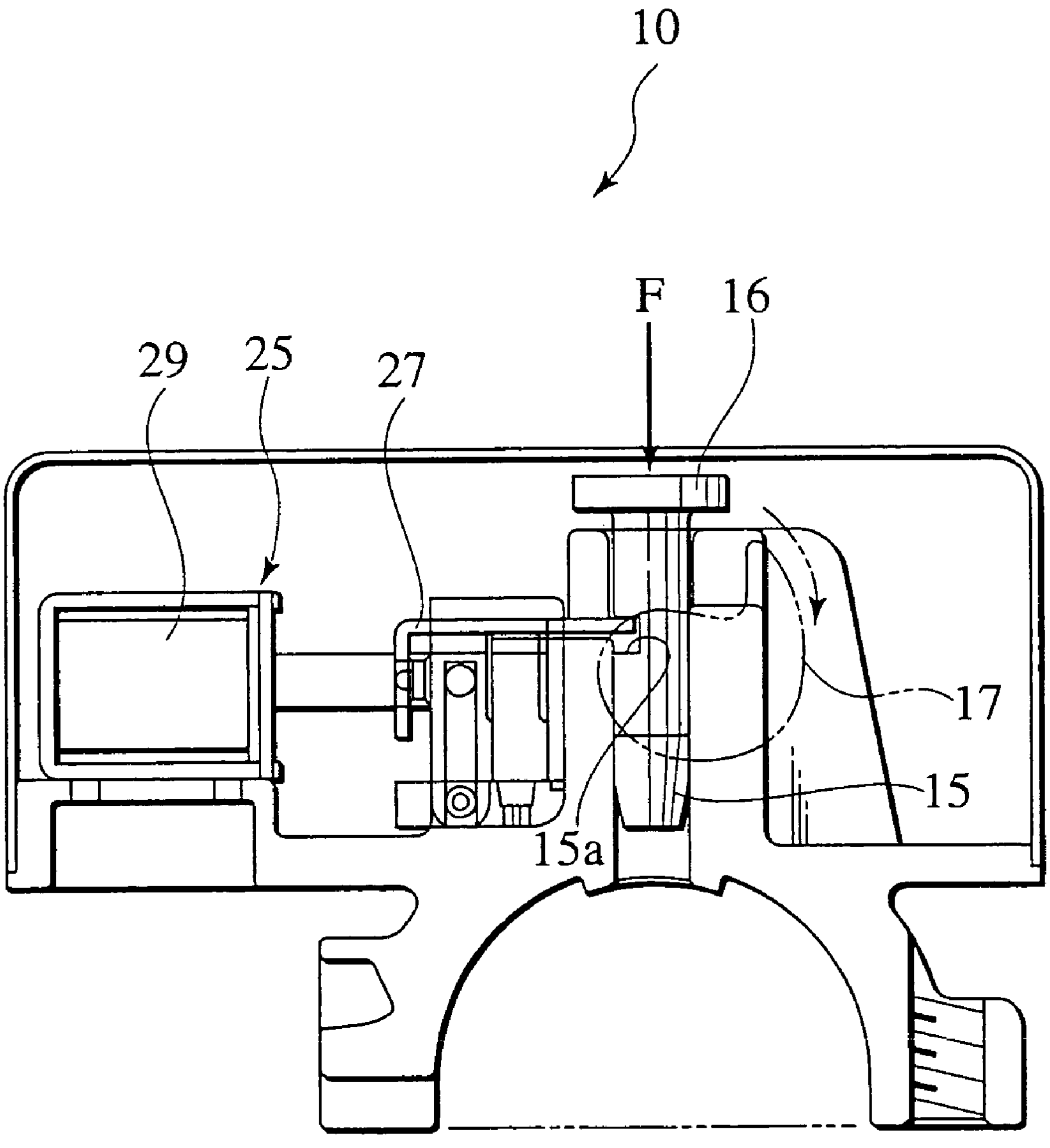
FIG. 10 is a cross sectional view taken on line SA—SA in FIG. 4 and showing a condition where a drive motor encounters erroneous operation.
Figure 11:
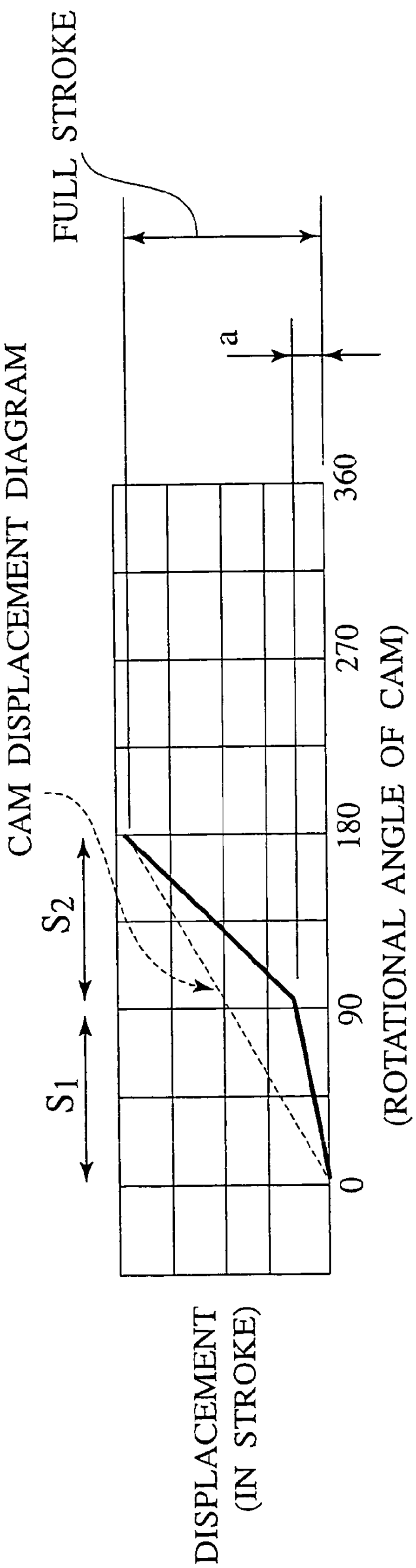
FIG. 11 is a cam displacement diagram showing the relationship between a rotational angle of a cam and a cam follower (lock shaft).

The steering-lock prevention device 25 operates such that under a condition where the solenoid 29 remains in an ON-state, the lock plate 27 protrudes into an engaging concave portion 15*a* and is located therein as shown in FIG. 9 to restrict protruding and retracting movements of the lock shaft 15. As a result, even if the motor is erroneously operated, as shown in FIG. 10, no danger is caused for the steering shaft to be locked during traveling of the vehicle. On the contrary, if the solenoid 29 remains in an OFF-state, as shown in FIG. 8, the lock plate 27 is returned to a retracted position by the action of a return spring, not shown, disposed in the solenoid 29, permitting the lock shaft 15 to operate for protruding and retracting movements.

<Operation>

A sequence of operation of the electrical steering lock device with such a structure is described.

Vehicle Parking Condition (Under Steering-Lock Condition)

Initially during parking of the vehicle, the lock shaft 15 of the electrical steering lock device 10 assumes the protruding position under which rotation of the steering lock shaft 11 is blocked. This allows the vehicle to be burglar-proofed.

Before Engine Start-Up (Under Steering-Unlock Condition)

Next, before engine starts up, if a switch, not shown, located in the vicinity of a driver's seat is pressed, the drive motor 21 of the electrical steering lock device 10 is actuated to shift the lock shaft 15 from the protruding position toward the retracting position in a sequence shown in FIG. 5→FIG. 6→FIG. 7. This allows the steering lock shaft 11 to be unlocked.

As the lock shaft 15 is moved to the retracting position, the solenoid 29 of the steering-lock prevention device 25 is turned on as shown in FIG. 9 to cause the lock plate 27 to enter the engaging concave portion 15*a* of the lock shaft 15, thereby preventing a danger of the steering shaft 11 being suddenly locked. Under the unlocked condition of the steering shaft 11, the vehicle enters a condition available to drive the vehicle, enabling start-up of the engine.

During Traveling Of Vehicle (Under Preventive Condition For Unintentional Steering-Lock)

During traveling of the vehicle, due to the operation of the steering-lock prevention device 25 of the steering lock device set forth above, the lock shaft 15 is maintained in the retracting position. This prevents the steering shaft 11 from being unintentionally locked during traveling of the vehicle.

During Engine Stop (Release of Steering-Lock Preventive Condition)

As the engine is stopped to enter ACC, under a condition where the steering-lock preventive condition shown in FIG. 9, the solenoid 29 is turned off and the lock plate 27 disengages from the engaging concave portion 15*a* of the lock shaft 15. This allows the steering-lock to be enabled.

During Parking of Vehicle (During Steering-Lock Step)

Under such a condition, if the switch, not shown, of the electrical steering lock device 10 is pressed again, the drive motor 21 is operated and the lock shaft 11 enters the lock groove 13 in a sequence as shown in FIG. 7→FIG. 6→FIG. 5. This allows the steering shaft 11 to be locked, resulting in a condition where the vehicle is burglar-proofed.

<Effects>

Here, with the electrical steering lock device 10 of the first embodiment, since the protruding and retracting speeds at which the lock shaft 15 moves are determined such that during unlocking process (in the sequence shown in FIG. 5→FIG. 6→FIG. 7) wherein the steering shaft 11 is switched from the locked condition to the unlocked condition, the first speed V1 associated with the inside of the lock groove 13 is lower than the second speed V2 associated with the outside of the lock groove 13, the lock shaft 15 is enabled to escape from the inside of the lock groove 13 to the outside of the lock groove 13 with increased torque.

Thus, with the electrical steering lock device 10 of the first embodiment, the lock shaft 15 is enabled to reliably disengage from the lock groove 13 without causing the drive motor 21 from being largely sized. Also, when this takes place, since the second speed V2 is set to be higher than the first speed V1, no delay occurs in unlocking time.

Second Embodiment

Figure 12:
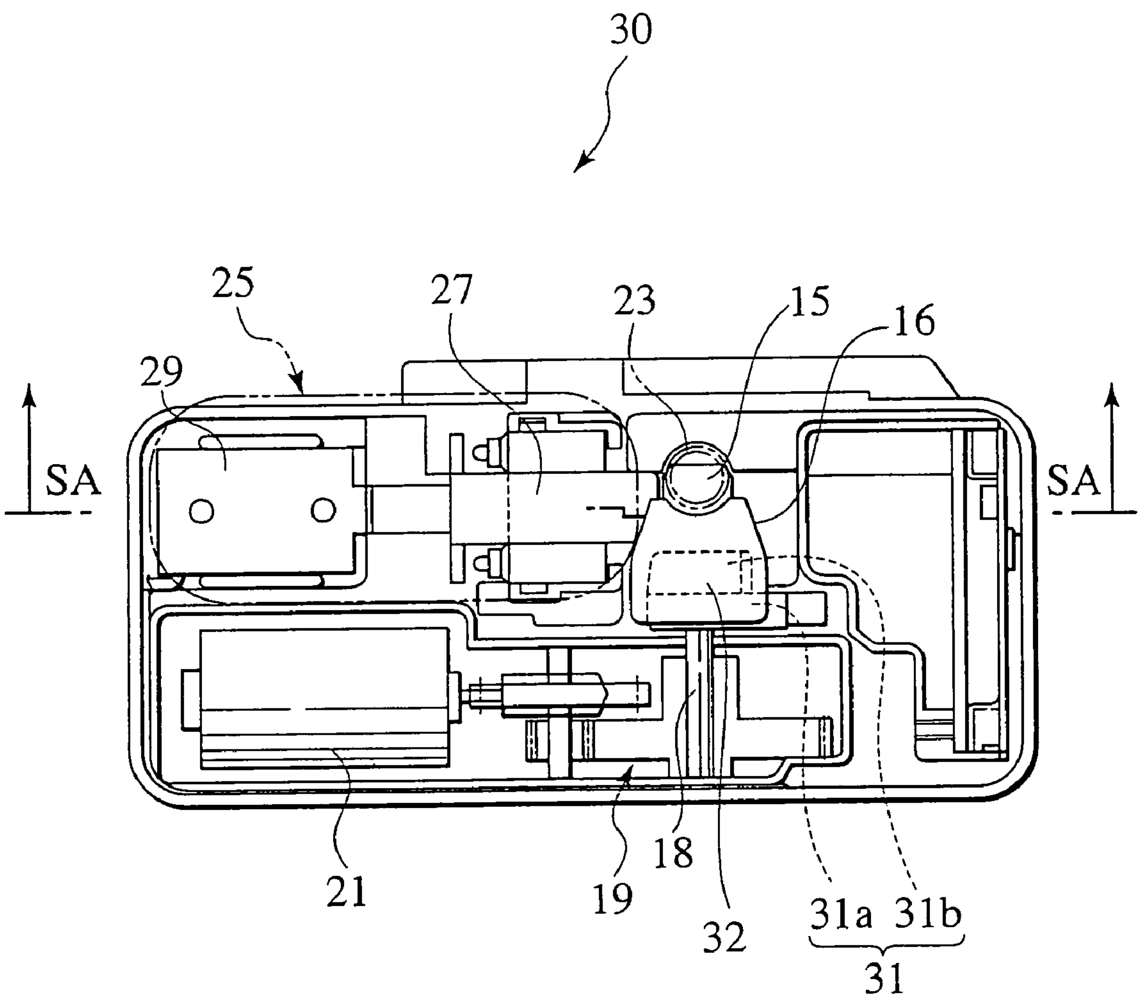
FIG. 12 is a front view illustrating an electrical steering lock device of a second embodiment of the present invention.
Figure 13:
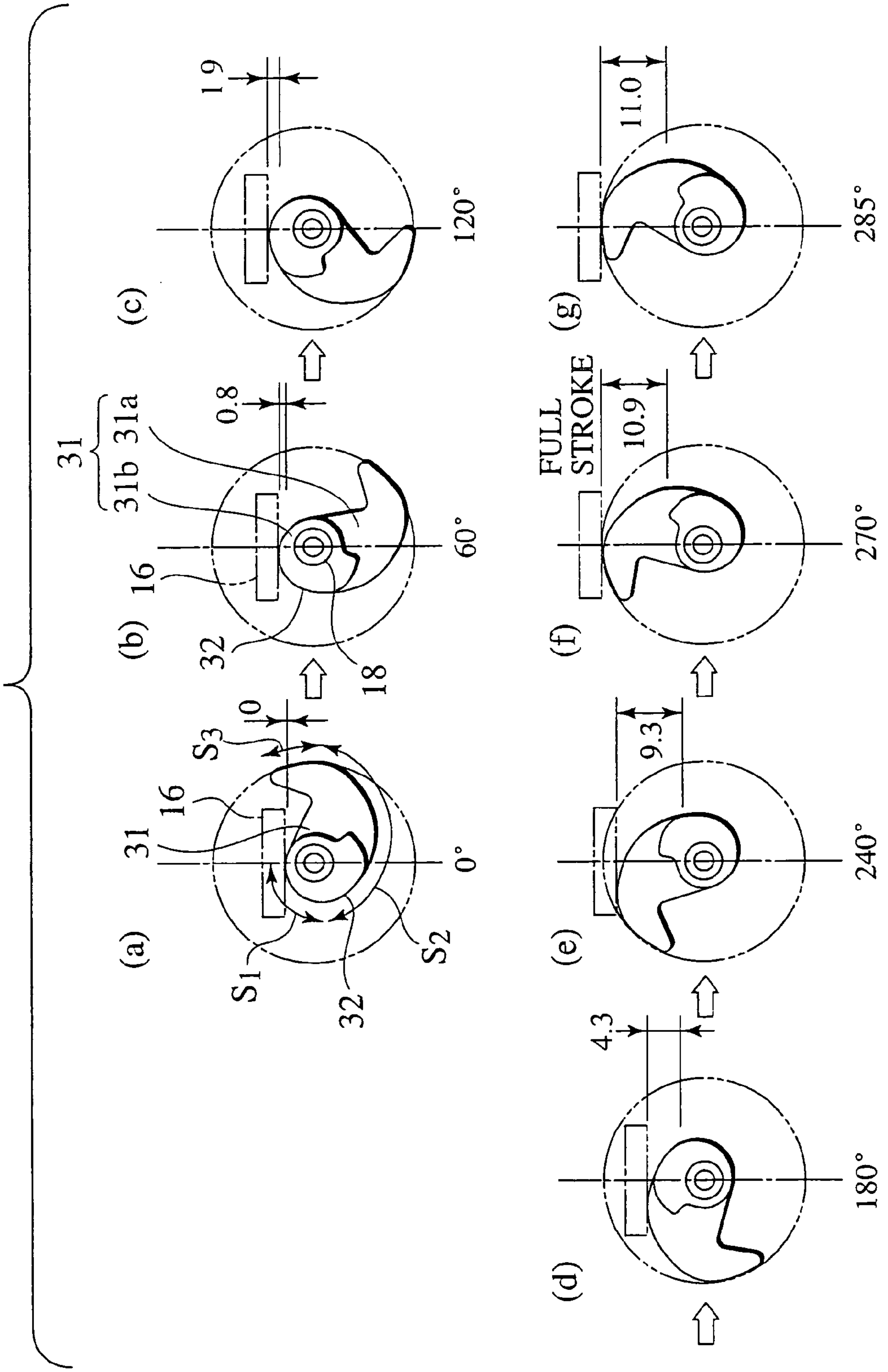
FIG. 13*a*–13*g* is an enlarged view of a plate cam of the electrical steering lock device shown in FIG. 12.
Figure 14:
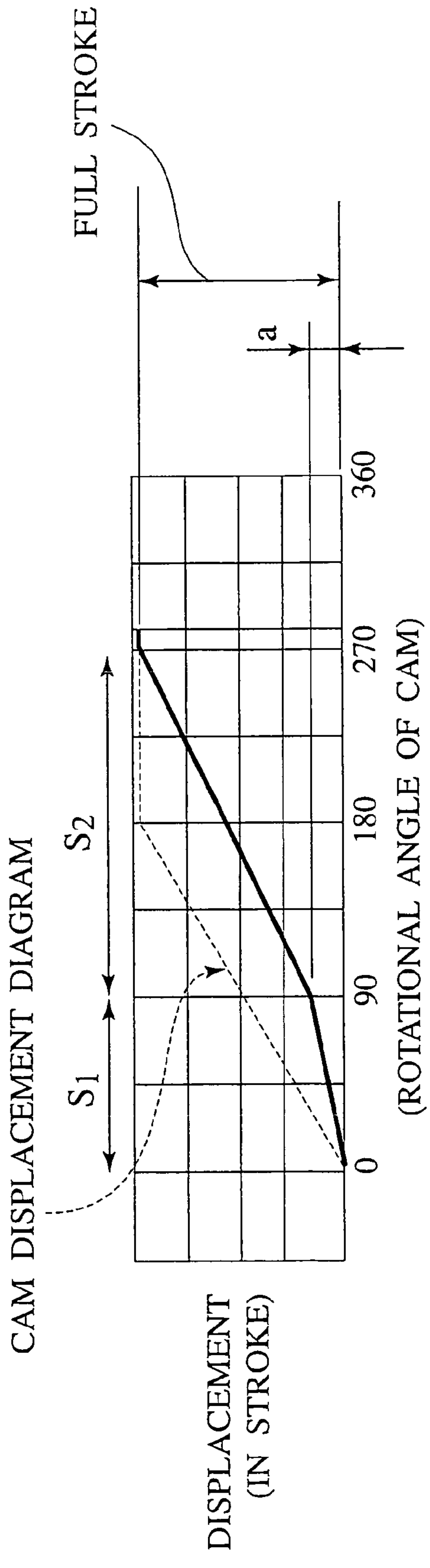
FIG. 14 is a cam displacement diagram showing the relationship between a rotational angle of a cam and a cam follower (lock shaft) in the electrical steering lock device of the second embodiment.

FIGS. 12 to 14 show an electrical steering lock device of a second embodiment of the present invention. Also, the same component parts as those of the first embodiments bear like reference numerals and description of a structure and operation as well as effects is omitted.

The steering lock device 30 of the second embodiment mainly differs from the first embodiment in two points described below.

First, as shown in FIG. 14, the plate cam 31 is set to have a contoured profile by which the lock shaft 15 is caused to move in a full stroke at a rotational angle of 270° and differs from the first embodiment in that the area S2 corresponding to the second speed V2 is set to have a rotational angle in a range between 90° and 270°.

Secondly, the electrical steering lock device 30 differs from the first embodiment in that as shown in FIGS. 12 and 13*a*–13*g*, the surface area of the sliding surface 32 between the plate cam 31 and the cam follower 15 includes the surface area S1 associated with the first speed V1, and the surface area S2 associated with the second speed V2 which is narrower than the surface area S1. More particularly, the plate cam 31 formed by overlapping a first plate segment 31*a* and a second plate segment 31*b*, which have different contoured shapes, allows the surface area of the sliding surface 32 of the plate cam 31 to be formed such that the surface area S1 associated with the first speed V1 is wider than the surface area S2 associated with the second speed V2.

Thus, since the sliding surface 32 of the plate cam 31 is determined such that the area S1 associated with the first speed V1 is wider than the area S2 associated with the second speed V2, the electrical steering lock device 30 of the second embodiment takes the form of a cam structure that is suited to be used for high load condition through the use of the area S1 (an area in which the lock shaft 15 remains in the lock groove 13) associated with the first speed V1. In other words, the sliding surface 32 can be set to be narrow in the area S2 associated with the second speed V2, it is advantageous for the plate cam 31 to be formed in a compact structure.

According to the present invention, the protruding and retracting speeds at which the lock shaft moves are set in a way to allow the first speed, associated with the inside of the lock groove, to be lower than the second speed associated with the outside of the lock groove, enabling the lock shaft to disengage from the lock groove to the outside thereof with increased torque. This enables the lock shaft to reliably disengage from the lock groove without causing the drive unit to be largely sized. Also, with the present invention, it does not matter if the first speed and the second speed are necessarily fixed.

Also, while with the first and second embodiments set forth above, a retracting force of the lock shaft to be applied by the drive unit is set using the cam mechanism, the present invention may be altered such that the retracting force of the lock shaft is set using output control of the drive unit per se.

As set forth above, according to the present invention, pulling the lock shaft out from the inside of the lock groove to the outside thereof with increased torque enables the lock shaft to reliably disengage from the lock groove.

Further, according to the present invention, due to the presence of the cam mechanism, comprised of the cam follower and the drive member, by which the first speed associated with the inside of the lock groove is lower than the second speed associated with the outside of the lock groove, the invention defined in Claim 1 can be realized in a simplified structure without causing the drive unit to be largely sized.

Besides, since the sliding surface between the drive member and the cam follower includes an area associated with the first speed that is set to be wider than another area associated with the second speed, the present invention has advantageous effects as mentioned above and, in addition, makes it possible to provide a cam structure suited for a high load condition occurring in the area (at a region in which the lock shaft remains in the lock groove) associated with the first speed. In other words, since the present invention makes it possible to set the sliding surface to be narrow in the area associated with the second speed while rendering the structure to be suited for high load, an advantage results in the formation of the drive member formed in a compact structure.

The entire contents of Japanese Patent Application No. P2003-169794 with a filing date of Jun. 13, 2003 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. An electrical steering lock device comprising:

a lock shaft operative to protrude into and retract from a lock groove, formed on a steering shaft, such that the lock shaft assumes a protruding position to engage with the lock groove for blocking rotation of the steering shaft while assuming a retracting position to disengage from the lock groove for unlocking rotation of the steering shaft;

a drive unit for protruding and retracting the lock shaft; and a drive member linked with the drive unit in engagement with the lock shaft, which serves as a cam follower, to protrude and retract the lock shaft with respect to the lock groove, wherein the drive member includes a cam having a cam surface with a contour shape to allow the lock shaft to move at a first speed, at which the lock shaft moves from inside the lock groove, to be slower than a second speed, at which the lock shaft moves outside the lock groove, and wherein a surface area of a sliding surface between the drive member and the cam follower includes a first surface area associated with the first speed and a second surface area associated with the second speed which is narrower than the first surface area.

2. The electrical steering lock device according to claim 1, wherein the retracting force, occurring when the lock shaft is retracted from the lock groove by the drive unit, is set such that the retracting force, occurring when the lock shaft is moved inside the lock groove, is set to be greater than that occurring when the lock shaft is moved outside the lock groove.

3. The electrical steering lock device according to claim 1, further comprising:

a steering-lock prevention device cooperating with the lock shaft and operative to restrict unintentional movement of the lock shaft toward the protruding position.

4. The electrical steering lock device according to claim 3, wherein the lock shaft includes an engaging portion; and the steering-lock prevention device includes a lock member selectively engageable with the engaging portion of the lock shaft to block unintentional locking movement of the lock shaft.

5. The electrical steering lock device according to claim 1, wherein the cam is formed by overlapping a first plate segment and a second plate segment, which have different contour shapes, and wherein the first surface area associated with the first speed includes cam surfaces of the first and second plate segments, and wherein the second surface area associated with the second speed includes a cam surface of the second plate segment.

6. An electrical steering lock device comprising:

lock means operative to protrude into and retract from a lock groove, formed on a steering shaft, such that the lock means assumes a protruding position to engage with the lock groove for locking rotation of the steering shaft while assuming a retracting position to disengage from the lock groove for unlocking rotation of the steering shaft;

drive means for protruding and retracting the lock means; and a cam means linked with the drive means in engagement with the lock means, which serves as a cam follower, to protrude and retract the lock means with respect to the lock groove, wherein the cam means includes a cam having a cam surface with a contour shape to allow the lock means to move at a first speed, at which the lock means moves from inside the lock groove, to be slower than a second speed, at which the lock means moves outside the lock groove, and wherein a surface area of a sliding surface between the cam means and the cam follower includes a first surface area associated with the first speed and a second surface area associated with the second speed which is narrower than the first surface area.

* * * * *